United States Patent [19]

Howard et al.

[11] 4,262,278
[45] Apr. 14, 1981

[54] DIAGNOSTIC BRAKE SYSTEM WARNING CIRCUIT

[75] Inventors: Donald W. Howard, South Bend; Dewey W. Eppley, Nappanee; John E. Mackiewicz, South Bend, all of Ind.

[73] Assignee: The Bendix Corporation, Southfield, Mich.

[21] Appl. No.: 83,440

[22] Filed: Oct. 10, 1979

[51] Int. Cl.³ .............................................. B60Q 1/44
[52] U.S. Cl. ................................. 340/52 C; 188/1 A
[58] Field of Search ............ 340/52 B, 52 C; 303/20, 303/80, 83; 188/1 A

[56] References Cited

U.S. PATENT DOCUMENTS

| | | | |
|---|---|---|---|
| 3,506,958 | 4/1970 | Kawabe | 340/52 C |
| 3,667,497 | 6/1972 | Farmery | 340/52 C |
| 4,025,781 | 5/1977 | Brearley | 188/1 A |

Primary Examiner—Alvin H. Waring
Attorney, Agent, or Firm—William A. Marvin; Ken C. Decker; Joel S. Carter

[57] ABSTRACT

A warning circuit generates warning signals in response to conditions of a vehicle brake system which includes main and back-up brake fluid pumps. The main pump is engine-driven and ignition-switch controlled. The back-up pump is relay actuated and battery powered. A sensor switch opens upon operation of the main pump and a brake switch closes during an operator brake application. The warning circuit includes a first OR gate with inputs coupled to the ignition and brake switches. The output of the first OR gate is coupled to the relay and to a first warning lamp. The output of the first OR gate is capacitively coupled to the set input of a set-reset flip-flop and is coupled to the reset input of the flip-flop. The reset input is also coupled to a terminal of the back-up source. The $\overline{Q}$ output of the flip-flop is coupled to an input of a second OR gate through an inverter. The other input of the second OR gate is coupled to the terminal of the back-up source, to the reset input and to the output of the first OR gate. The output of the second OR gate is coupled to a controlled switch which becomes conducting to turn on the first warning lamp. A second warning lamp is coupled to the ignition switch and is coupled to a ground potential through an interruptible connection provided by the sensor switch.

16 Claims, 1 Drawing Figure

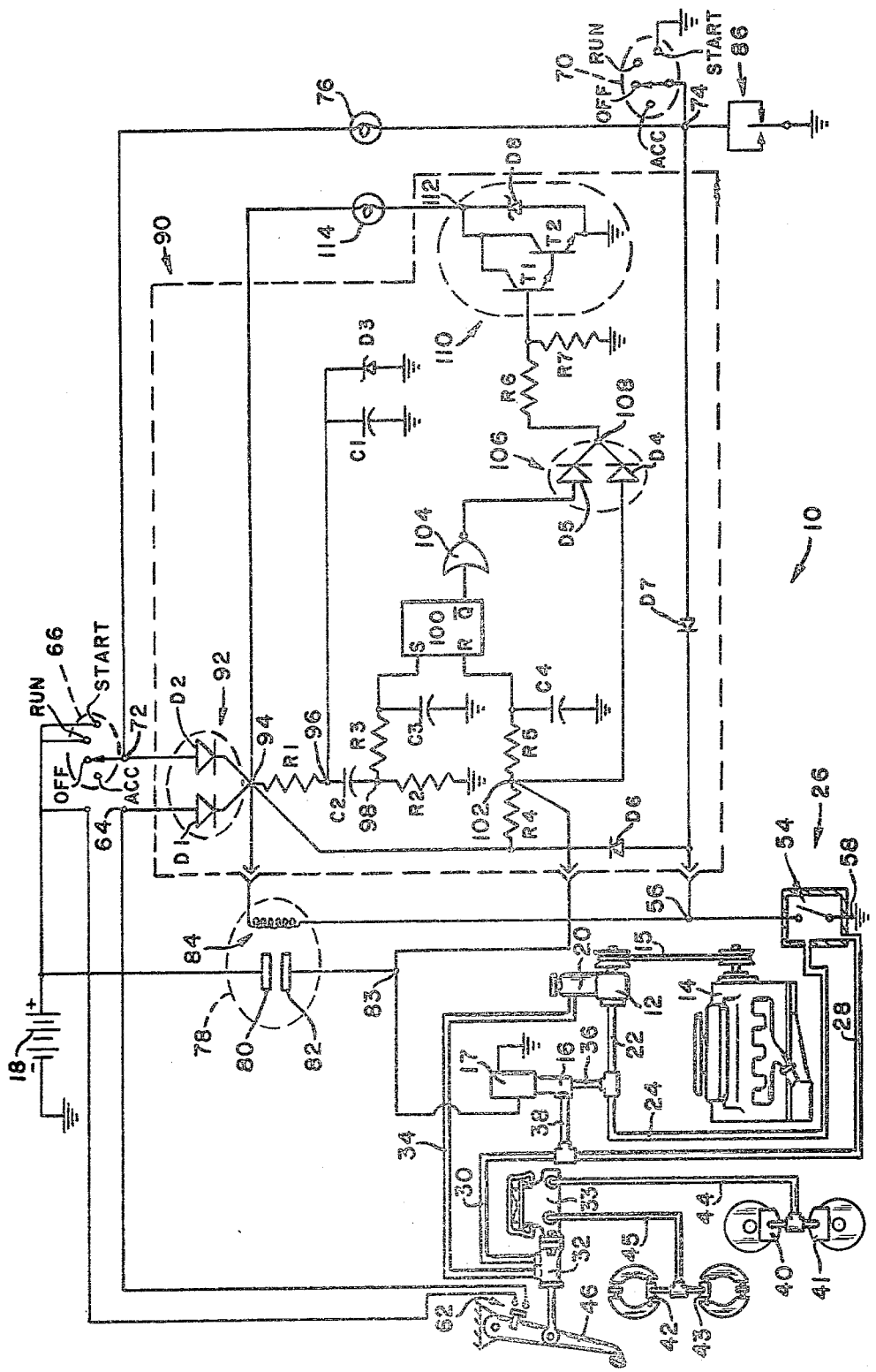

DIAGNOSTIC BRAKE SYSTEM WARNING CIRCUIT

BACKGROUND OF THE INVENTION

This invention relates to an improved circuit arrangement for actuating a warning device in response to abnormal conditions of a vehicle hydraulic brake system with main and auxiliary sources of hydraulic pressure.

In vehicles equipped with hydraulically-actuated power brake boosters, an engine-driven or main source of hydraulic pressure, such as a power steering pump, may be utilized in combination with a auxiliary source of hydraulic pressure, such as a second pump driven by an electric motor powered off the vehicle battery. When the vehicle and its brake system are operating normally, the power steering pump operates when the vehicle engine is operating.

One prior art electronic brake system warning circuit generates a warning signal in response to various abnormal conditions of such a brake system. Particularly, an abnormal condition exists when the ignition switch is "on", but the main pump is not operating. However, the referenced warning circuit does not generate a warning signal in response to this abnormal condition, unless simultaneously with this condition, there also occurs either (1) an operator brake application, or (2) an open circuit condition in the auxiliary pump motor.

Another warning circuit is described in copending application Ser. No. 83,443, which is commonly assigned with the present application. Neither of these warning circuits energizes the auxiliary pump when the main pump is not operating while the vehicle ignition is on in the absence of an operator brake application. Therefore, an undesirable time lag between brake application and the generation of full reserve brake pressure could result since the auxiliary pump is not actuated until the brakes are applied. Furthermore, with neither of the circuits described above, can a vehicle operator discriminate among any of the particular conditions under which warning signals are generated.

A third warning circuit is described in copending application Ser. No. 83,441, which is commonly assigned with the present application. However, this third circuit only generates a warning signal in response to the blowing of a fuse which is used to protect brake system control circuitry.

SUMMARY OF THE INVENTION

An advantage of the improved brake system warning circuit is that it provides a diagnostic test function of a vehicle auxiliary brake system during vehicle startup.

Another advantage of the improved warning circuit is that it energizes an auxiliary pump and indicates an abnormal condition when the main pump is off and the ignition is on, even if the brakes are not applied.

Another major advantage of the improved warning circuit is that it provides different warning signals which correspond to different conditions of the vehicle brake system.

These and other advantages are achieved by the present invention in that it provides a warning circuit which actuates a pair of warning indicators in response to abnormal conditions of a vehicle hydraulic brake system.

The hydraulic brake system includes an engine-driven main source of hydraulic fluid pressure, such as a power steering pump, and a relay-actuated, battery-powered, back-up auxiliary source of hydraulic brake pressure. A sensor switch opens in response to the operation of the power steering pump and a brake switch connects the warning circuit with the battery in response to an operator brake application. The warning circuit includes a first OR gate with inputs coupled to the ignition and brake switches. The output of the first OR gate is coupled to the relay and to a first warning lamp. The output of the first OR gate is resistively and capacitively coupled to the set input of a set-reset flip-flop and is resistively coupled to the reset input of the flip-flop. The reset input is also coupled to a terminal of the auxiliary source.

The Q output of the flip-flop is coupled to an input of a second OR gate through an inverter. The other input of the second OR gate is coupled to the terminal of the back-up source, to the reset input and to the output of the first OR gate. The output of the second OR gate is coupled to a controlled switch which becomes conducting to turn on a first warning lamp. A second warning lamp is coupled to the ignition switch and is coupled to a ground potential through an interruptible connection provided by the sensor switch.

BRIEF DESCRIPTION OF THE DRAWING

The sole FIGURE of the Drawing is a detailed schematic diagram of a vehicle brake system including a brake system warning circuit constructed in accordance with the invention.

DETAILED DESCRIPTION

A vehicle brake system 10 includes a main hydraulic power steering fluid pump 12 powered by the engine 14 via belt 15 and an auxiliary or back-up brake fluid pump 16 driven by an electric motor 17 powered by the vehicle battery 18. Power steering pump 12 pumps hydraulic fluid from reservoir 20 through conduits 22 and 24, fluid flow sensor 26, conduits 28 and 30, to brake booster 32 and back to reservoir 20 through return 34. Pump 16 pumps fluid from reservoir 20 through pump 12, conduits 22, 36, 38, and 30 to brake booster 32 and back to reservoir 20 through return 34. Master cylinder 33 communicates pressurized brake fluid to wheel assemblies 40, 41, 42, and 43 via conduits 44 and 45 in response to vehicle operator brake applications applied via brake pedal 46.

Fluid flow sensor 26 senses the operation of the power steering pump 12 by sensing fluid flow through conduits 24 and 28. Sensor 26 includes a switch 54 connected between a terminal 56 and a grounded terminal 58. Sensor 26 operates to close switch 54 unless the power steering pump 12 is operating.

A brake switch 62 is adapted to interruptibly connect terminal 64 with the positive terminal of battery 18. Ignition switch 66 and switch 70 are ganged together. Ignition switch 66 may be closed to connect terminal 72 with the positive terminal of battery 18 when the operator turns the ignition key (not shown) to the "start" or the "run" positions. Switch 70 connects terminal 74 with ground when the ignition switch 66 is in the "start" position to provide a bulb test for warning lamp 76, which is connected between terminals 72 and 74.

A relay device 78 includes a pair of contacts 80 and 82 which close to connect terminal 83 of the electric motor 17 with the vehicle battery 18. The relay device 78 includes a relay coil 84 which may be energized to connect contacts 80 and 82. The winding (not shown) of motor 17 provides a low impedance connection between terminal 83 and ground. A conventional brake pressure differential warning device 86 may be provided to connect terminal 74 with ground to actuate warning lamp 76 in response to a predetermined fluid pressure imbalance in the brake fluid conduits 44 and 45 communicated to device 86 through conduits (not shown).

The warning circuit 90 includes an first OR gate 92 consisting of a pair of diodes D1 and D2. The anode of diode D1 is connected to terminal 64 and the anode of diode D2 is connected to terminal 72. The cathodes of diodes D1 and D2 are commonly connected at terminal 94. The output terminal 94 of OR gate 92 is high whenever either or both of switches 62 and 66 are closed. A resistor R1 is connected between terminal 94 and a terminal 96. A parallel-connected capacitor C1 and zener diode D3 are connected between terminal 96 and ground. The resistor R1, the capacitor C1, and the diode D3 cooperate to regulate the voltage which appears at terminal 96 when either of switches 62 and 68 are closed. A capacitor C2 couples terminal 96 with terminal 98 and a resistor R2 couples terminal 98 with ground. A resistor R3 couples terminal 98 with the set input S of set-reset flip-flop 100. A capacitor C3 couples the set input S of flip-flop 100 with ground and protects the set input S from undesirable high frequency transients.

Set-reset flip-flop 100 includes the set S input and a reset input R. Flip-flop 100 also includes a $\bar{Q}$ output and a Q output (not shown). Only the $\bar{Q}$ output is utilized in this circuit. The flip-flop 100 is a typical bistable set-reset flip-flop, so that when the set S input is high and the reset R input is low, then the $\bar{Q}$ output is forced low. The $\bar{Q}$ output is forced high when the reset R input is high and the set S input is low. If both the set S and the reset R inputs are low, then the flip-flop 100 maintains its state.

A resistor R4 couples terminal 94 with a terminal 102 and resistor R5 couples terminal 102 to the reset R input of flip-flop 100. A capacitor C4 couples the reset R input with ground and protects the reset R input from undesirable high frequency transients. Terminal 102 is coupled to terminal 83 of auxiliary pump motor 17 and to relay contact 82.

The $\bar{Q}$ output of flipflop 100 is connected to an inverter 104 whose output is low when $\bar{Q}$ is high and whose output is high when $\bar{Q}$ is low. OR gate 106 includes a pair of diodes D4 and D5. The anode of diode D4 is connected to terminal 102 and the anode of diode D5 is connected to the output of inverter 104. The cathodes of diodes D4 and D5 are connected together at terminal 108. The output at terminal 108 of OR gate 106 is high whenever either or both of the signals at the anodes of diodes D4 and D5 are high. A diode D6 has its cathode connected to terminal 94 and its anode connected to terminal 56. A diode D7 has its cathode connected to terminal 56 and its anode connected to terminal 74. Diode D7 prevents actuation of the electric motor-driven pump 16 if the pressure differential switch 86 is grounded due to a failure in the brake system if sensor switch 26 is open.

A switching device 110 includes a pair of npn transistors T1 and T2 coupled in a Darlington configuration wherein the emitter of transistor T1 is coupled to the base of transistor T2, the emitter of transistor T2 is coupled to ground and the collector terminals of transistors T1 and T2 are coupled together to terminal 112. A Zener diode D8 has its cathode connected to terminal 112 and its anode grounded commonly with the emitter of transistor T2. Zener diode D8 protects transistor switch 110 from external voltage transients which could appear at terminal 112. A resistor R6 connects the output terminal 108 of OR gate 106 with the base of transistor T1 and resistor R7 connects the base of transistor T1 with ground. Finally, warning lamp 114 is connected between terminals 94 and 112.

Although not shown in the drawings, it should be noted that a combination warning circuit could be constructed by combining the instant circuit and of the fuse failure warning circuit disclosed in Application Ser. No. 83,441.

The method of operation of the brake warning system will now be more fully explained in the following. The brake system warning circuit 90 in one mode of operation performs a diagnostic test of the brake system 10 when the vehicle is started. The diagnostic test verifies proper operation of the relay device 78, of the wiring between the battery 18 and the auxiliary pump motor 17, and of the sensor 26.

To begin, if the ignition switch 66 is in the accessory (ACC) or off position and if the brakes are not applied so that switch 62 is open, then both terminals 64 and 72 are disconnected from the positive battery voltage and the output of OR gate 92 at terminal 94 is low. With low voltage at both terminals 72 and 94, neither lamp 76, nor lamp 114 energized, regardless of whether or not an open circuit condition occurs in the connection of terminal 83 with ground provided by motor 17. Since the engine 14 is off, the engine-driven main pump 12 is not operating and the switch 54 of sensor assembly 26 is closed. These are the initial conditions for the test before the engine is started.

When, however, the ignition switch is turned to the "run" position, then the voltage at terminals 72 and 94, and, initially, at the set S input of flip-flop 100 goes high. Lamp 76 is turned on by the current which flows from terminal 72 to ground through lamp 76, terminal 74, forward biased diode D7, and normally closed sensor switch 54. Failure of lamp 76 to turn on initially when the ignition switch is in the "seen" position before engine starting is indicative of a failed sensor 26. The reset R input remains initially low because relay 78 has not yet become energized and because of the low impedance connection which connects terminals 102 and 83 with ground through motor 17. The high level signal at the set S input toggles the Q output of flip-flop 100 from high to low and the output of inverter 104 from low to high. The high level inverter output forces the output of OR gate 106 high, which in turn, causes controlled switch device 110 to become conducting between terminal 112 and ground, thereby allowing current to flow from the battery 18 to ground through switch 66, terminal 72, lamp 114, and through switch device 110. Thus, both lamps 76 and 114 are turned on as switch 66 is initially closed to the "seen" position. Under these conditions, capacitor C2 eventually charges up so that the entire high voltage at terminal 96 is dropped across capacitor C2, and so that the set S input of flip-flop 100 returns to a low level. However, flip-flop 100 does not change state as the set S input returns to low voltage and, therefore, the warning lamps 114 and 76 remain on.

A predetermined time after capacitor C2 charges up, due to a time delay built into the relay device 78, relay coil 84 is energized by the current which flows to ground from terminal 94, through coil 84 and closed sensor switch 54. The energized coil 84 unites contacts 80 and 82 so that positive battery voltage is applied to terminals 83 and 102 and to the auxiliary pump motor 17. The high voltage at terminal 102 causes high voltage to be applied to the reset R input of flip-flop 100 through resistor R5 so that the $\overline{Q}$ output is reset high and so that the output of inverter 104 assumes a low level. However, since diode D4 of OR gate 106 is also coupled to the high voltage at terminal 102, the output of OR gate 106 remains high even though the output of inverter 104 goes low. Thus, switch 110 remains conducting and lamp 114 remains on as the auxiliary motor 17 is energized. Similarly, lamp 76 remains on as described previously.

If, as is normally the case during the above-described sequence, the main engine-driven pump 12 begins operating, then the flow of hydraulic fluid through conduits 24 and 28 and through flow sensor 26 causes sensor switch 54 to open to disconnect terminal 56 from ground to thereby stop the electrical current flow through relay coil 84, thus de-activating relay 78 and separating contacts 80 and 82. As contacts 80 and 82 separate, high voltage is removed from terminal 83. Low voltage now exists at terminals 83 and 102 and at the anode of diode D4 and at the reset R input of the flip-flop 100 due to the low impedance connection of terminal 83 with ground provided by motor 17. The high-to-low voltage change at reset R of flip-flop 100 causes no change in the $\overline{Q}$ output nor in the output of inverter 104, which remains low. However, the high-to-low voltage change at diode D4 causes the output of OR gate 106 to go low which causes switch 110 to become nonconducting between terminal 112 and ground, thus turning off warning lamp 114. The opening of sensor switch 54 eliminates the ground connection of lamp 76 and turns off lamp 76. Thus, during normal operation when the auxiliary motor 17 is energized before the main pump 12 begins to operate, both warning lamps 76 and 114 are turned off when the main pump 12 begins to operate. The above description also applies if, in addition, the brake switch 62 is closed due to an operator brake application.

However, while the main pump 12 is operating during the above-described sequence, an open circuit condition may occur in the connection provided by motor 17 between terminal 83 and ground. Such an open circuit condition eliminates the low impedance path between terminals 83 and 102 and ground which would otherwise be provided by motor 17. The loss of this low impedance path permits the high voltage at terminal 94 to be transmitted through resistor R4 to diode D4 of OR gate 106. The high voltage at diode D4 raises the output of OR gate 106 and thus, causes controlled switch 110 to become conducting to turn on warning lamp 114. However, warning lamp 76 remains off because sensor switch 54 is open due to the operation of main pump 12. The loss of the low impedance path also turns on lamp 114 if, in addition, the brake switch 62 is closed due to an operator brake application.

Now assume that the main engine-driven pump 12 begins to operate without the auxiliary pump motor 17 ever being energized. This situation could arise due to a failure of the relay device 78 or of the connecting wires between battery 18 and motor 17. As described before, operation of main pump 12 opens sensor switch 54 and turns off lamp 76. However, in this case, because the motor 17 is never energized, high voltage never appears at terminals 83 and 102, nor at the reset R input of flip-flop 100. As a result, flip-flop 100 is never reset and thus, the $\overline{Q}$ output remains low, and the outputs of inverter 104 and of OR gate 106 remains high so that switch 110 remains conducting and lamp 114 remains on. In this manner, lamp 114 remains on after the engine 14 has been started and after the main pump 12 begins to operate to indicate a failure in the auxiliary brake system.

Now, assume that the ignition switch 66 is off or open. Also assume that the engine 14 and main pump 12 are off so that sensor switch 54 is closed. Assume further that a vehicle brake application through pedal 46 closes brake switch 62 and connects terminal 64 with positive battery voltage. Since switch 66 is open, no voltage is applied to terminal 72 and lamp 76 will be off. The high voltage at terminal 64 causes the output at 94 of OR gate 92 to go high. This initially sets flip-flop 100, which is then reset when, after the predetermined delay, relay 78 is actuated to energize auxiliary pump motor 17. The relay 78 is actuated since switch 54 is closed to permit current to flow through the relay coil 84. The flip-flop 100 is set and then reset in the manner previously described herein with regard to diagnostic test function of warning circuit 90, except that in this case the flip-flop 100 is set by closure of the brake switch 62, rather than by closure of the ignition switch 66. As before, the Q output of the reset flip-flop 100 is high and therefore, the output of inverter 104 is low. However, since the motor 17 is energized, positive voltage occurs at terminals 83 and 102, whether or not an open circuit condition exists in the connection of terminal 83 with ground provided by motor 17. This high voltage at terminal 102 causes a high output level at the output 108 of OR gate 106, despite the low output of inverter 104. The high output of OR gate 106 keeps controlled switch 110 in the conducting state between terminal 112 and ground so that current continues to flow through and turn on warning lamp 114. In this manner, the voltage at terminal 83 of the energized auxiliary pump motor 17 keeps the warning lamp 114 on when the brakes are applied while the ignition switch 66 is off and while the main pump 12 is not operating.

Now, assume that the ignition switch 66 is closed to couple terminal 72 with the positive terminal of battery 18. Also, assume that the main pump 12 is not operating, as would be the case if belt 15 were broken. Because main pump 12 is not operating, sensor switch 54 is closed. The positive voltage at terminal 72 turns on lamp 76 and raises the output at 94 of OR gate 92. With the ignition switch 66 closed, the output of OR gate 92 will be high whether or not brake switch 62 is closed due to an operator brake application. The high output of OR gate 92 causes current to flow through relay coil 84 and closed sensor switch 54, thus actuating the relay 78. The contacts 80 and 82 of actuated relay 78 unite to connect terminal 83 with the positive terminal of battery 18. Thus, high voltage exists at both terminals 83 and 102, whether or not an open circuit condition exists in the connection between terminal 83 and ground provided by auxiliary pump motor 17. The high voltage at terminal 102 forces high the output at 108 of OR gate 106 so that controlled switch 110 is conducting between terminal 112 and ground. The conducting controlled switch 110 turns on warning lamp 114 as previously described. Thus, when the ignition switch 66 is closed while the main pump 12 is not operating, both warning lamps 114 and 72 are on, where, as previously described, only lamp 114 is on when the main pump is not operating and only the brake switch 62 is closed.

We claim:

1. A warning circuit in an engine-driven vehicle with a brake system having a primary source of brake actuation fluid pressure powered by the vehicle engine, a reserve source of brake actuation fluid pressure, means for generating a first control signal in response to operation of the engine, means for generating a second control signal in response to a brake application, the warning circuit comprising:
   a first gate having an output and having inputs for receiving said first and second control signals, said first gate generating an output signal when said control signals are in selected states;
   a bistable device comprising a set input coupled to the output of the first gate, and comprising a reset input for coupling with the output of the first gate and for coupling with a terminal of the controlled reserve source, said bistable device having an output with a first state triggered by the output signal of said first gate and with a second state triggered by a state of the reserve source; and
   a second gate having a first input coupled to the output of the bistable device and having a second input for coupling with said terminal, said second gate producing a warning signal at an output thereof when the output signal of the bistable device and the reserve source are in selected states.

2. The brake system of claim 1, further comprising:
   sensor means for sensing the operation of the primary source; and
   relay means operatively coupled to said terminal, to said sensor means and to the output of the first gate for energizing the reserve source when the output of the first gate and the sensor means are in selected states.

3. A warning circuit for a vehicle with a brake system and with an engine which may be actuated by first switch, the brake system having primary and auxiliary sources of brake actuation fluid pressure, sensor means for sensing the operation of the primary source and relay means operatively connected to the sensor means, to the auxiliary source and to a second switch actuated by an operator brake application, said relay means energizing the auxiliary source in response to the actuation of at least one of said first and second switches unless the primary source is operating, the warning circuit comprising:
   a first gate having inputs coupling with said first switch and second switch, the first gate generating an output signal when the switch means are in selected states;
   a bistable device with a set input coupled to the output of the first gate and with a reset input coupled to the output of the first gate and coupled with a terminal common to the relay means and the auxiliary source, the bistable device having an output with a first state triggered by the output signal of the first gate and with a second state triggered by a state of the auxiliary source; and
   a second gate having a first input coupled to the output of the bistable device and having a second input for coupling with the terminal, the second gate generating a warning signal at an output thereof when the output of the bistable device and the auxiliary source are in selected states.

4. The warning circuit of claim 3, further including: a capacitance connected between the output of the first gate and the set input of said bistable device.

5. The warning circuit of claim 3, further comprising:
   means for coupling the second input of the second gate with the output of the first gate and with ground potential through said auxiliary source.

6. A warning circuit for a vehicle with an engine and a brake system, the vehicle having first switch means for actuating the engine, the brake system having primary and auxiliary sources of brake actuation fluid pressure, sensor means for sensing the operation of the primary source, relay means operatively connected to the sensor means and to the auxiliary source for energizing the auxiliary source, and second switch means for actuating the relay means in response to an operator brake application, the warning circuit comprising:
   means for actuating the relay means to energize the auxiliary source in response to actuation of either one of the switch means upon failure of the primary source.

7. The warning circuit of claim 6, wherein:
   the circuit means comprises an OR gate with a first input for coupling with the first switch means and with a second input for coupling with the second switch means, the OR gate having output means for coupling with the relay means and for actuating the relay means when either of the switch means is actuated.

8. The warning circuit for a vehicle with a brake system and with an engine which may be actuated by first switch means, the brake system having an engine driven primary source and an auxiliary source of brake actuation fluid pressure, sensor means for sensing the operation of the primary source, second switch means responsive to an operator brake application, and relay means operatively connected to the sensor means, to the auxiliary source and to the second switch means for energizing the auxiliary source in response to the actuation of either one of the switch means unless the primary source is operating, the warning circuit comprising:
   means for actuating a first warning device in response to selected states of the switch means and of the primary and auxiliary sources; and
   means for actuating a second warning device in response to predetermined states of the switch means and of the primary and auxiliary source, at least one of the selected states being distinct from the predetermined states.

9. A warning circuit for a vehicle having a brake system and having an engine which may be started by first switch means, the brake system having primary and auxiliary sources of brake actuation pressure, sensor means for sensing the operation of the primary source, second switch means operable in response to an operator brake application and relay means operatively connected to the sensor means, to at least one of the switch means and to the auxiliary source for energizing the auxiliary source, the warning circuit comprising:
   a bistable device with a first input for coupling with at least one of the switch means and with a second input for coupling with the auxiliary source, the bistable device having an output with a first state triggered by the one switch means and with a second state triggered by energization of the auxiliary source; and a first gate with a first input coupled to the output of the bistable device and with a second input for coupling with the auxiliary source, the first gate generating a warning signal when the auxiliary source and the output of the bistable device are in selected states.

10. A diagnostic and control circuit for a brake system of an engine-driven vehicle including at least one pressure actuated brake, a primary source of brake actuation pressure, and an auxiliary source of brake actuation pressure, said circuit comprising:
  means for sensing the actuation of the brake and for generating a brake actuation signal indicative thereof;
  means for sensing the operation of the engine and for generating an engine operating signal indicative thereof;
  means for sensing the operational state of the primary source and for generating a primary source signal;
  means, responsive to said primary source signal, said engine-operating signal, and said brake actuation signal, for actuating said secondary source whenever said brake actuation signal indicates said brake has been actuated, or whenever said engine-operating signal indicates operation of the engine, and said primary source signal indicates said primary source is not actuated; and
  means, responsive to the actuation of the secondary source, for indicating said secondary source has been actuated.

11. A circuit as previously defined in claim 10 wherein said indicating means includes:
  means for discriminating between actuation of said secondary source by said engine operation signal or by said brake actuation signal.

12. A circuit as previously defined in claim 11 wherein said discriminating means includes:
  a first indicator providing a visual indication of the actuation of the secondary source by said engine-operating signal or said brake actuation signal; and
  a second indicator providing a visual indication of the actuation of the secondary source only by said engine-operating signal.

13. A circuit as previously defined in claim 10 which further includes:
  means for sensing the operability of the secondary source and for generating a secondary source operational signal indicative thereof;
  wherein said indicating means if additionally responsive to said secondary source operational signal whether or not said primary source signal indicates the primary source is actuated.

14. A circuit as previously defined in claim 10 which further includes:
  means for sensing an actuation signal to said secondary source and for generating a relay connection signal indicative thereof;
  latching means for holding the indication means in an operational state when set, said latching means being set by said engine operational signal or said brake actuation signal and being reset by said relay connection signal.

15. A warning circuit for a vehicle with an engine and a brake system, the vehicle having first switch means for actuating the engine, the brake system having primary and auxiliary sources of brake actuation pressure, sensor means for sensing the operation of the primary source, relay means operatively connected to the sensor means and to the auxiliary source for energizing the auxiliary source, and second switch means for actuating the relay means in response to an operator brake application, the warning circuit comprising:
  means for actuating the relay means to energize the auxiliary source in response to actuation of either one of the switch means upon failure of the primary source;
  the actuating means includes an OR gate with a first input for coupling with the first switch means and with a second input for coupling with the second switch means, the OR gate having output means for coupling with the relay means and for actuating the relay means when either of the switch means is actuated;
  means for coupling a first terminal of the relay means with the output means of the OR gate; and
  means for coupling a second terminal of the relay means with a ground potential through the sensor means, the sensor means being capable of uncoupling the second terminal from the ground potential to prevent actuation of the relay means upon operation of the primary source.

16. A warning circuit for a vehicle with a brake system and with an engine which may be actuated by first switch means, the brake system having an engine driven primary source and an auxiliary source of brake actuation pressure, sensor means for sensing the operation of the primary source, second switch means responsive to an operator brake application, and relay means operatively connected to the sensor means, to the auxiliary source and to the second switch means for energizing the auxiliary source in response to the actuation of either one of the switch means unless the primary source is operating, the warning circuit comprising:
  means for actuating a first warning device in response to selected states of said first and second switch means and of the primary and auxiliary sources;
  means for actuating a second warning device in response to predetermined states of said first and second switch means and of the primary and auxiliary source, at least one of the selected states being distinct from the predetermined states; and
  wherein one of the warning devices comprises a first terminal connected with one of the switch means and a second terminal for coupling with the warning circuit; and wherein the warning circuit comprises means for coupling the second terminal with a ground potential through the sensor means, the sensor means coupling the second terminal with the ground potential in response to operation of the primary source so that the one warning device may be actuated when the one switch means is actuated.

* * * * *

Disclaimer 4,262,278. —*Donald W. Howard*, South Bend, *Dewey W. Eppley*, Nappanee, and *John E. Mackiewicz*, South Bend, Ind. DIAGNOSTIC BRAKE SYSTEM WARNING CIRCUIT. Patent dated Apr. 14, 1981. Disclaimer filed May 26, 1981, by the assignee, *The Bendix Corp.*

Hereby enters this disclaimer to claims 6, 7, 8, 10, 11, 12, 13, 14, 15 and 16 of said patent.

[*Official Gazette May 31, 1983.*]